US010971920B2

(12) United States Patent
Fuseya et al.

(10) Patent No.: US 10,971,920 B2
(45) Date of Patent: Apr. 6, 2021

(54) OVERCURRENT PROTECTION DEVICE ESTIMATING A WIRE THERMAL CHARACTERISTIC

(71) Applicants: DENSO ELECTRONICS CORPORATION, Anjo (JP); TOYOTA JIDOSHA KABUSHIKI KAISHA, Toyota (JP)

(72) Inventors: Tomokatsu Fuseya, Anjo (JP); Naoyuki Yasuda, Anjo (JP); Manabu Morita, Anjo (JP); Jiro Ito, Toyota (JP); Shinji Oshita, Toyota (JP)

(73) Assignees: DENSO ELECTRONICS CORPORATION, Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 16/106,650

(22) Filed: Aug. 21, 2018

(65) Prior Publication Data

US 2019/0165564 A1 May 30, 2019

(30) Foreign Application Priority Data

Nov. 27, 2017 (JP) .............................. JP2017-227083

(51) Int. Cl.
*H02H 3/087* (2006.01)
*H02H 5/04* (2006.01)
(Continued)

(52) U.S. Cl.
CPC ......... *H02H 5/041* (2013.01); *B60R 16/0207* (2013.01); *B60R 16/03* (2013.01);
(Continued)

(58) Field of Classification Search
CPC ........ H02H 6/005; H02H 3/087; H02H 3/095; H02H 5/041; H02H 5/047; H02H 7/228; H02H 3/10; B60R 16/0207; B60R 16/03
See application file for complete search history.

(56) References Cited

U.S. PATENT DOCUMENTS

| 5,856,711 A | 1/1999 | Kato et al. |
| 2008/0285197 A1* | 11/2008 | Nakamura ............. H02H 3/087 |
| | | 361/93.8 |

(Continued)

FOREIGN PATENT DOCUMENTS

| JP | H9238425 A | 9/1997 |
| JP | H9257859 A | 10/1997 |

(Continued)

*Primary Examiner* — Harry R Behm
(74) *Attorney, Agent, or Firm* — Harness, Dickey & Pierce, P.L.C.

(57) ABSTRACT

An overcurrent protection device is to be provided between a power supply and a load circuit including an electric load and an electric wire electrically connected with each other, and includes a switching element, a current detector, a characteristic estimation portion, and a controller. The switching element switches flowing and interrupting of a load current that flows from the power supply to the electric load. The current detector detects the load current. The characteristic estimation portion estimates a thermal characteristic of the electric wire based on the load current detected by the current detector. The controller outputs an overcurrent protection signal for interrupting the load current so as to protect the load circuit from an overcurrent to the switching element based on the thermal characteristic estimated by the characteristic estimation portion and the load current detected by the current detector.

6 Claims, 5 Drawing Sheets

(51) Int. Cl.
*B60R 16/02* (2006.01)
*H02H 3/093* (2006.01)
*H02H 3/10* (2006.01)
*B60R 16/03* (2006.01)
*H02H 6/00* (2006.01)
*H02H 7/22* (2006.01)

(52) U.S. Cl.
CPC ............ *H02H 3/0935* (2013.01); *H02H 3/10* (2013.01); *H02H 5/047* (2013.01); *H02H 6/005* (2013.01); *H02H 3/087* (2013.01); *H02H 7/228* (2013.01)

(56) References Cited

U.S. PATENT DOCUMENTS

| | | | | |
|---|---|---|---|---|
| 2010/0254059 | A1* | 10/2010 | Higuchi | H02H 7/228 |
| | | | | 361/103 |
| 2012/0022708 | A1* | 1/2012 | Higuchi | H02H 3/085 |
| | | | | 700/293 |
| 2012/0081825 | A1* | 4/2012 | Nakamura | H02H 7/228 |
| | | | | 361/93.8 |
| 2018/0351346 | A1* | 12/2018 | Sugisawa | H02H 1/0007 |
| 2019/0052076 | A1* | 2/2019 | Asam | H02H 3/08 |

FOREIGN PATENT DOCUMENTS

| | | |
|---|---|---|
| JP | 2014-027875 A | 2/2014 |
| JP | 2018-011427 A | 1/2018 |

* cited by examiner

OVERCURRENT PROTECTION DEVICE ESTIMATING A WIRE THERMAL CHARACTERISTIC

CROSS REFERENCE TO RELATED APPLICATIONS

The present application is based on and claims priority to Japanese Patent Application No. 2017-227083 filed on Nov. 27, 2017, the disclosure of which is incorporated herein by reference.

TECHNICAL FIELD

The present disclosure relates to an overcurrent protection device.

BACKGROUND

An overcurrent protection device calculates a temperature of an electric wire based on a thermal characteristic of the electric wire connecting a load and an power supply and a current value flowing through the electric wire, and protects the electric wire from an overcurrent by cutting off the load circuit when it is determined that the temperature of the electric wire exceeds a predetermined threshold temperature (for example, see JP 2014-27875 A). As the thermal characteristic, for example, a thermal resistance and a heat capacity can be used (for example, see JP 2014-27875 A).

SUMMARY

In the conventional overcurrent protection device, a predetermined fixed value was used as the thermal characteristic of the electric wire. However, in actuality, the thermal characteristic depends on the type of electric wire. For example, even if wire diameters are the same, if wire types are different, the thermal characteristics are different. In addition, even if wire types are the same, if wire diameters are different, thermal characteristics are different.

Therefore, in order to realize a more appropriate overcurrent protection operation in this type of overcurrent protection device, it is necessary to consider the difference in thermal characteristics due to the difference in the type of electric wire as described above. In this regard, there may be cases where various electric loads are provided within one product (for example, a vehicle). In this case, different types of electric wires can be used within one product according to the specification of the electric load. For this reason, conventionally, it was necessary to prepare a plurality of overcurrent protection devices respectively adapted to various load circuits within one product.

The present disclosure has been made in view of the circumstances exemplified above. It is an object of the present disclosure to provide a general-purpose overcurrent protection device that can be adapted to various types of load circuits.

An overcurrent protection device according to an aspect of the present disclosure is to be provided between a power supply and a load circuit including an electric load and an electric wire electrically connected with each other, and includes a switching element, a current detector, a characteristic estimation portion, and a controller. The load circuit includes an electric load and an electric wire. The switching element switches flowing and interrupting of a load current that flows from the power supply to the electric load. The current detector detects the load current. The characteristic estimation portion estimates a thermal characteristic of the electric wire based on the load current detected by the current detector. The controller outputs an overcurrent protection signal for interrupting the load current so as to protect the load circuit from an overcurrent to the switching element based on the thermal characteristic estimated by the characteristic estimation portion and the load current detected by the current detector.

In the above-described configuration, the current detector detects the load current flowing through the load circuit that includes the electric load and the electric wire. Based on the thermal characteristic of the electric wire and the load current detected by the current detector, the controller outputs the overcurrent protection signal for interrupting the load current so as to protect the load circuit from the overcurrent to the switching element.

By the way, normally, an appropriate wire type and an appropriate wire diameter of the electric wire are determined so as not to cause deterioration, smoke emission or ignition of the electric wire when the load current flows through the electric wire. Also, the thermal characteristic of the electric wire may differ according to the wire type and the wire diameter of the electric wire. In this respect, in the above-described configuration, the thermal characteristic of the electric wire is estimated by the characteristic estimation portion based on the load current detected by the current detector. Therefore, the above-described overcurrent protection device can be provided as a general-purpose overcurrent protection device that is adaptable to various load circuits.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Hereinafter, an embodiment will be described with reference to the drawings. Note that various modifications applicable to the embodiment are collectively described after explanation of the embodiment because understanding of the embodiment may be interfered when inserted in the middle of a series of explanations related to the embodiment.

(Configuration)

Figure 1:
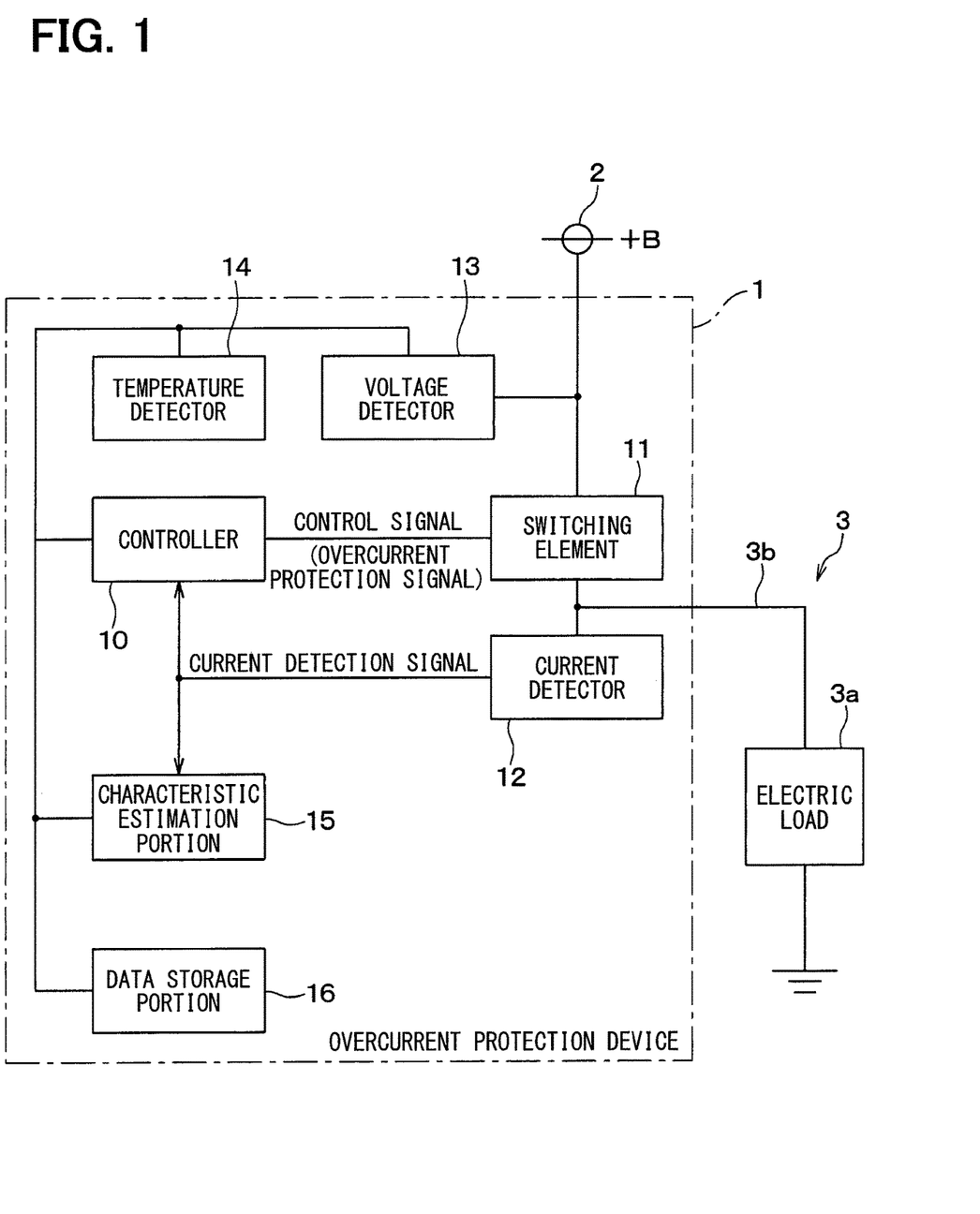
FIG. 1 is a schematic circuit diagram showing a configuration of an overcurrent protection device according to an embodiment.

As shown in FIG. 1, an overcurrent protection device 1 is provided between a power supply 2 and a load circuit 3 so as to protect the load circuit 3 from an overcurrent. The load circuit 3 includes an electric load 3a and an electric wire 3b electrically connected to each other.

In the present embodiment, the overcurrent protection device 1 is mounted on a vehicle (not shown). Specifically, the overcurrent protection device 1 is provided in a vehicle load control electronic control unit (ECU) that controls driving of an electric load 3a that is an in-vehicle load. That is, the overcurrent protection device 1 has a function as a load drive circuit for controlling the drive of the electric load 3a. The vehicle load control ECU that controls the driving of the electric load 3a will be simply referred to as "vehicle load control ECU" hereinafter. The electric wire 3b is a so-called vehicle wire harness, and is provided so as to connect the overcurrent protection device 1 and the electric load 3a.

The overcurrent protection device 1 includes a controller 10, a switching element 11, a current detector 12, a voltage detector 13, a temperature detector 14, a characteristic estimation portion 15, and a data storage portion 16.

In the present embodiment, the overcurrent protection device 1 includes an intelligent power device, a control IC, and a rewritable nonvolatile memory, which are installed in the vehicle load control ECU. The controller 10 that performs overall operation control of the overcurrent protection device 1 is provided as a functional configuration in the control IC that controls the operation of the intelligent power device.

Specifically, the controller 10 outputs a control signal to the switching element 11 based on, for example, a command signal received from an external source of the vehicle load control ECU. The control signal is a signal for switching the flowing and interrupting of the load current that flows through the electric load 3a. In addition, the controller 10 outputs an overcurrent protection signal to the switching element 11. The overcurrent protection signal is a signal for interrupting the load current even when the control signal is in a state of allowing the load current to flow (i.e., "ON" state) for protecting the load circuit 3 from an overcurrent.

The switching element 11 is, for example, a power semiconductor element provided inside the intelligent power device, and is configured by a metal-oxide-semiconductor field-effect transistor (MOSFET), for example. That is, the switching element 11 is configured so as to switch the flowing and interrupting of the load current that flows from the power supply 2 to the electric load 3a in accordance with the control signal input to the control terminal (i.e., a gate, for example). In addition, the switching element 11 is configured to interrupt the load current when the overcurrent protection signal is input to the control terminal.

The current detector 12 is provided so as to detect the load current. That is, the current detector 12 is configured to output an electrical output (voltage, for example) corresponding to the load current. Specifically, for example, the current detector 12 may be provided inside the intelligent power device so as to generate an output corresponding to a voltage (i.e., a drain-source voltage, for example) between an inflow side terminal and an outflow side terminal of the load current in the switching element 11. Alternatively, for example, the current detector 12 may be configured to generate an output corresponding to a voltage across a current detection resistor interposed in a current path of the load current or a shunt path that shunts the load current at a predetermined ratio.

The voltage detector 13 is provided so as to detect a power supply voltage that is the output voltage of the power supply 2. That is, the current detector 12 is configured to output an electrical output (voltage, for example) corresponding to the power supply voltage. Specifically, for example, the voltage detector 13 may be provided to generate an output corresponding to a voltage obtained by dividing the power supply voltage by a predetermined ratio.

The temperature detector 14 is provided to generate an output corresponding to the ambient temperature of the overcurrent protection device 1 or the electric wire 3b. In particular, the temperature detector 14 may be provided inside the intelligent power device so as to generate an output corresponding to the temperature of the intelligent power device.

In the present embodiment, the characteristic estimation portion 15 is provided as a functional configuration in the control IC. The characteristic estimation portion 15 estimates the thermal characteristic of the electric wire 3b based on the load current detected by the current detector 12, the power supply voltage detected by the voltage detector 13, and the ambient temperature detected by the temperature detector 14. The thermal characteristic includes a thermal resistance and a heat capacity.

Specifically, in the present embodiment, the characteristic estimation portion 15 estimates the thermal characteristic of the electric wire 3b based on a temporal change of the load current detected by the current detector 12, the power supply voltage detected by the voltage detector 13, the ambient temperature detected by the temperature detector 14, and various data stored in the data storage portion 16. That is, the controller 10 estimates the temperature of the electric wire 3b based on the thermal characteristic estimated by the characteristic estimation portion 15 and the load current detected by the current detector 12, and outputs the overcurrent protection signal when the estimated temperature exceeds a predetermined threshold temperature.

The data storage portion 16 is a rewritable nonvolatile memory embedded in the control IC in the vehicle load control ECU or mounted separately from the control IC, and is configured by a flash ROM, for example. That is, while the data storage portion 16 is capable of rewriting data when the power supply is on, the data storage portion 16 has a function of retaining the data after the power supply is cut off.

In the data storage portion 16, information relating to thermal characteristics of a plurality of types of electric wires 3b is stored correspondingly to each type. The thermal characteristics are values determined by a wire type and a wire diameter. Specifically, the thermal characteristics are mainly determined by a material and a cross-sectional area of a central conductor and a material and a cross-sectional area of an insulator layer covering a periphery of the central conductor.

The wire type includes, for example, AVS, AVSS, CIVUS, and AEX. AVS means a low voltage electric wire for vehicles, in which an insulator layer covering a periphery of a central conductor is made of vinyl chloride and the insulator layer is a thin type. AVSS means that the insulator layer in the AVS is an extremely thin type. CIVUS means that, in a low voltage electric wire for vehicles, a central conductor is a compressed conductor and an insulator layer is an ultra-thin type vinyl chloride. AEX means a low voltage electric wire for vehicles, in which an insulator layer is made of cross-linked polyethylene.

The wire diameter is a value based on the calculated cross-sectional area of the central conductor and is also called "size". That is, the size 0.3 sq corresponds to the calculated cross-sectional area of the central conductor of 0.3817 $mm^2$, the size 0.5 sq corresponds to the calculated cross-sectional area of the central conductor of 0.5629 $mm^2$, and the size 0.85 sq corresponds to the calculated cross-sectional area of the central conductor of 0.8846 $mm^2$.

Figure 2:
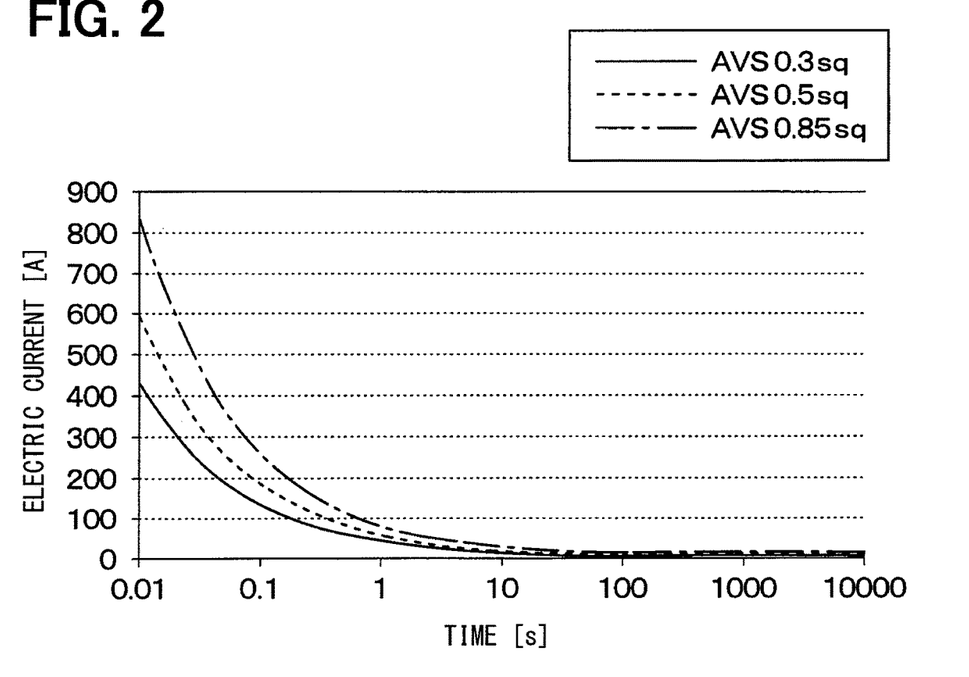
FIG. 2 is a graph showing an example of allowable current characteristics of electric wires stored in a data storage portion shown in FIG. 1.
Figure 3:
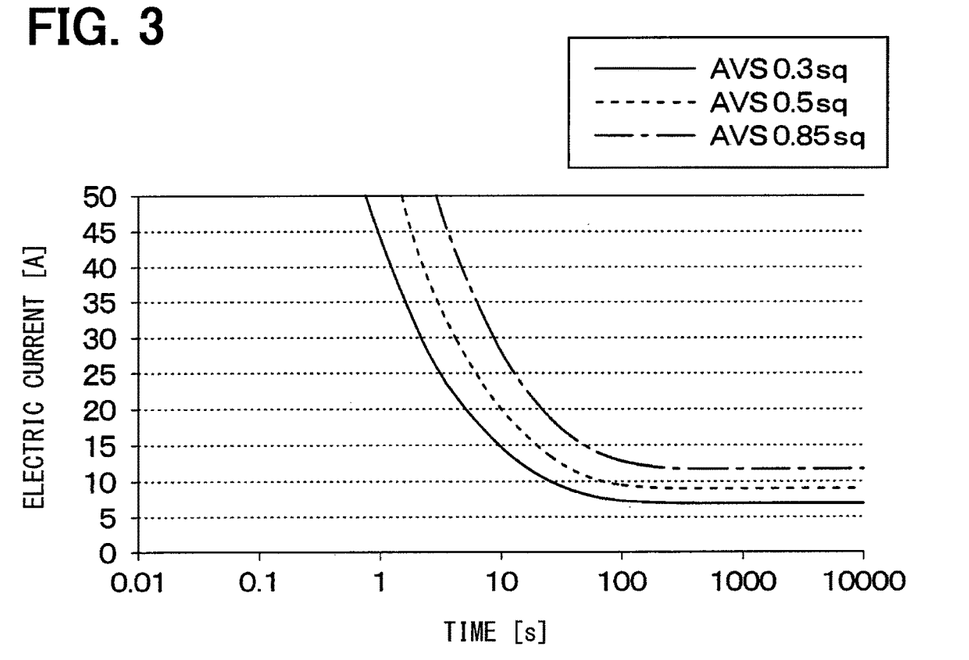
FIG. 3 is a graph showing an example of allowable current characteristics of electric wires stored in the data storage portion shown in FIG. 1.
Figure 4:
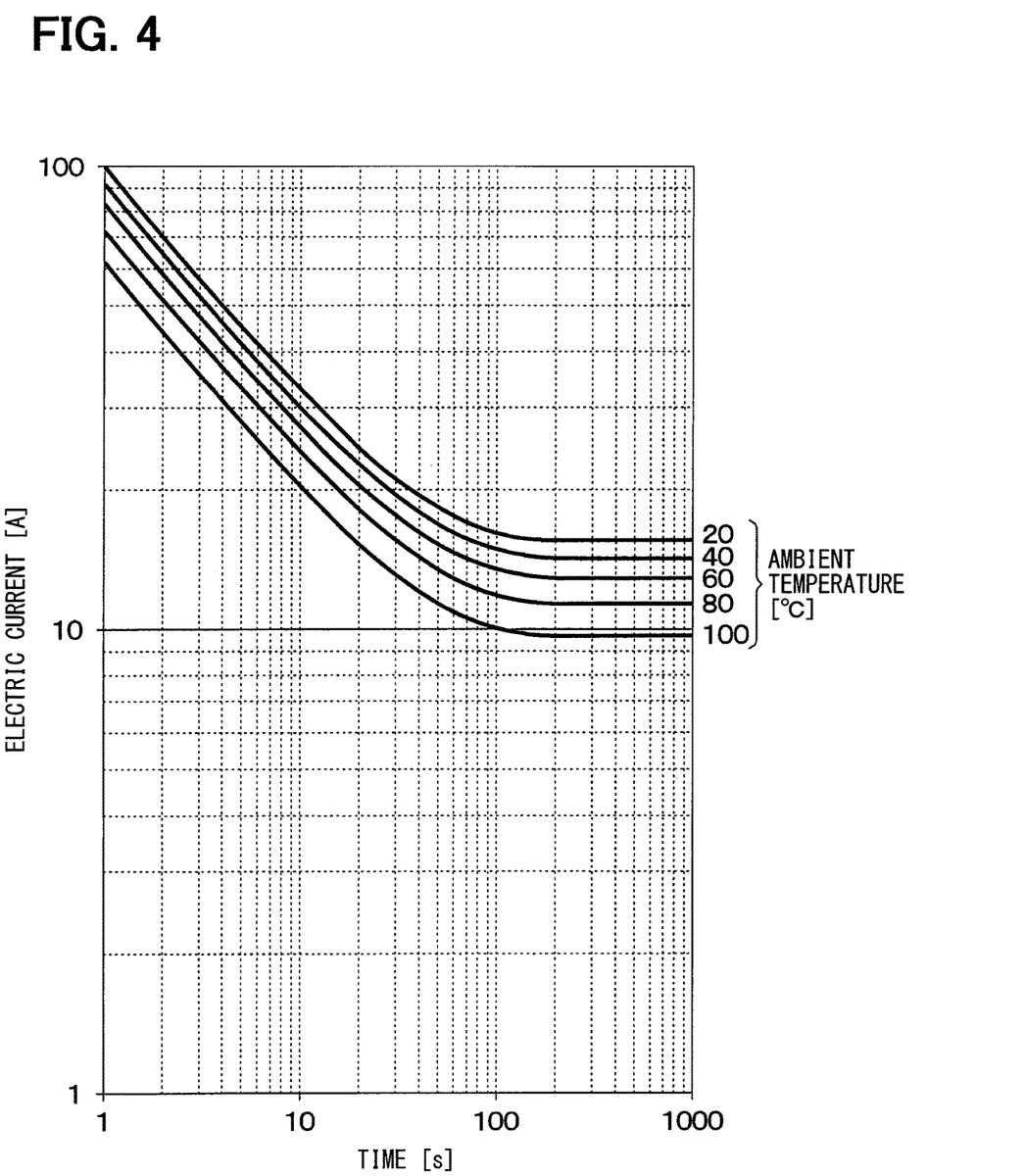
FIG. 4 is a graph showing an example of allowable current characteristics of electric wires stored in the data storage portion shown in FIG. 1.

FIG. 2 and FIG. 3 show allowable current characteristics corresponding to a plurality of sizes at a specific ambient temperature in the electric wire 3b of a specific type, specifically, AVS. FIG. 3 is an enlarged view of a portion on a low current side in FIG. 2. FIG. 4 shows a change of the allowable current characteristic corresponding to the change of the ambient temperature in the electric wire 3b of a specific type, specifically, AVS 0.3 sq.

The "allowable current characteristic" is a relationship between a current value that flows through the electric wire 3b and a time until the electric wire 3b reaches an allowable temperature when the electric current continues to flow, and can be calculated from the thermal characteristic of the electric wire 3b. The information that can be calculated from the thermal characteristic of the electric wire 3b can be said as information related to the thermal characteristic of the electric wire 3b. The "allowable temperature" is a temperature at which the electric wire 3b does not deteriorate, or a temperature at which the electric wire 3b does not emit smoke or ignite. The allowable current characteristic is also referred to as "smoke emission characteristic", for example, in a catalog of the electric wire 3b that is currently on the market.

Hereinafter, an outline of an operation of the overcurrent protection device 1 according to the present embodiment will be described together with operational effects achieved by the overcurrent protection device 1 with reference to the respective drawings.

The controller 10 outputs the control signal to the switching element 11 based on a received command signal. The control signal is input to the control terminal of the switching element 11. As a result, a switching operation corresponding to the control signal is executed by the switching element 11.

In this manner, the controller 10 controls ON/OFF of the switching element 11 in accordance with the received command signal. Accordingly, the load current is controlled.

The current detector 12 detects the load current. The controller 10 estimates the temperature of the electric wire 3b based on the thermal characteristic of the electric wire 3b, the load current detected by the current detector 12, and the ambient temperature detected by the temperature detector 14. When the temperature of the estimated electric wire 3b exceeds a predetermined threshold temperature, the controller 10 interrupts the load current by outputting an overcurrent protection signal.

The thermal characteristic of the electric wire 3b may vary depending on the type of the electric wire 3b. In this respect, in the configuration according to the present embodiment, the characteristic estimation portion 15 estimates the thermal characteristic of the electric wire 3b based on the load current detected by the current detector 12. That is, the characteristic estimation portion 15 estimates the type of the electric wire 3b based on the temporal change of the load current detected by the current detector 12 and the thermal characteristic stored in the data storage portion 16. Further, the characteristic estimation portion 15 estimates the thermal characteristic corresponding to the estimated type of the electric wire 3b as the thermal characteristic of the electric wire 3b.

Figure 5:
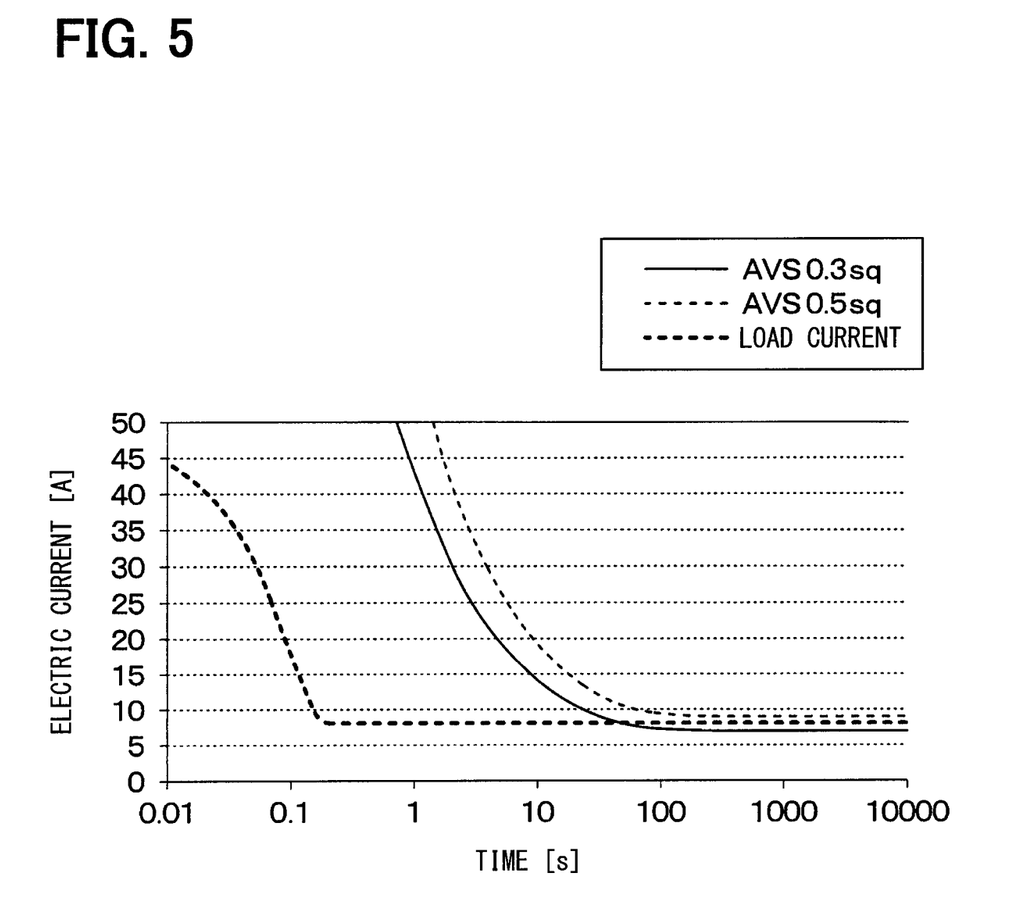
FIG. 5 is a graph showing an operation example of the overcurrent protection device shown in FIG. 1.

Specifically, in the present embodiment, the characteristic estimation portion 15 reads the thermal characteristics of a plurality of wire types and wire diameters from the data storage portion 16. Further, the characteristic estimation portion 15 calculates the allowable current characteristic of the corresponding wire type and wire diameter, as shown in FIG. 5, based on each of the plurality of thermal characteristics read from the data storage portion 16. In FIG. 5, in order to avoid complexity of illustration and explanation, among a large number of calculated allowable current characteristics, only two allowable current characteristics closest to a curve showing the temporal change of the load current are illustrated. The curve showing the temporal change of the load current is hereinafter abbreviated as the "load current curve".

The load current is affected by the power supply voltage and the ambient temperature. Thus, in the estimation by the characteristic estimation portion 15, it is necessary to use a current value considering the influence of the power supply voltage and the ambient temperature. Therefore, in the present embodiment, the characteristic estimation portion 15 acquires the load current curve based on the value obtained by correcting the load current detected by the current detector 12 with the power supply voltage and the ambient temperature. The influence of variations in characteristics and aging can also be assumed. Therefore, the load current detected by current detector 12 may be multiplied by a predetermined coefficient.

Further, the characteristic estimation portion 15 estimates the type of the electric wire 3b by comparing the load current curve based on the load current detected by the current detector 12 with the plurality of calculated allowable current characteristics. Specifically, the characteristic estimation portion 15 specifies one of the plurality of allowable current characteristics that is always on a higher current side than the load current curve and is closest to the load current curve. Further, the characteristic estimation portion 15 estimates the wire type and the wire diameter corresponding to the specified allowable current characteristic as the type of the electric wire 3b.

In the specific example shown in FIG. 5, between the two allowable current characteristics closest to the load current curve, the allowable current characteristic of AVS 0.3 sq intersects with the load current curve in a section where an energization time is between 10 seconds and 100 seconds, and the allowable current characteristic of AVS 0.3 sq is on a lower current side than the load current curve on a longer time side than the intersection. On the other hand, the allowable current characteristic of AVS 0.5 sq does not intersect with the load current curve for all energization time and is always on the higher current side than the load current curve. Therefore, in this case, the characteristic estimation portion 15 estimates the type of the electric wire 3b as AVS 0.5 sq.

The characteristic estimation portion 15 estimates the thermal characteristic corresponding to the type of the electric wire 3b estimated as described above as the thermal characteristic of the electric wire 3b. In the specific example shown in FIG. 5, the characteristic estimation portion 15 estimates the thermal characteristic of the electric wire 3b to be the same value as the thermal characteristic of AVS 0.5 sq. The controller 10 executes the overcurrent protection control based on the estimated thermal characteristic.

Figure 6:
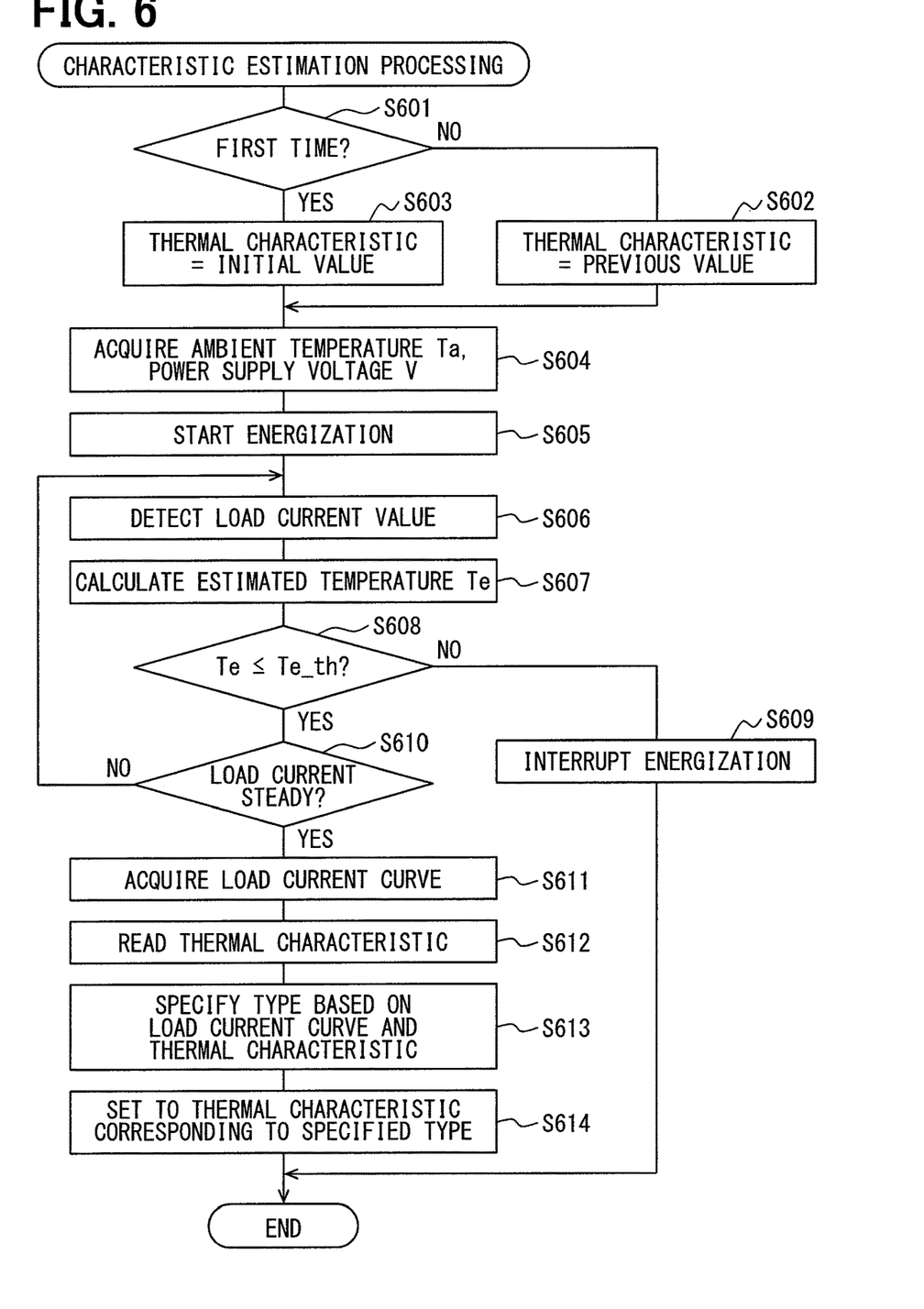
FIG. 6 is a flowchart showing an operation example of the overcurrent protection device shown in FIG. 1.

FIG. 6 shows an example of an estimation processing of the thermal characteristic of the electric wire 3b in the overcurrent protection device 1. In the drawings and the following description in the specification, "step" is simply abbreviated as "S".

The overcurrent protection device 1 executes a characteristic estimation processing shown in FIG. 6 at a predetermined timing. For example, the characteristic estimation processing is forcibly executed by an external operation at a shipping inspection of the vehicle. Further, the characteristic estimation processing may be executed periodically, or may be executed when a specific condition is satisfied, for example, when an ignition switch of the vehicle is turned on.

As is apparent from the above description, during the characteristic estimation processing, the load current flows through the load circuit 3 for a predetermined time. Therefore, even during the characteristic estimation processing, the possibility of overheating of the electric wire 3b due to an overcurrent cannot be denied. Therefore, it is necessary to provisionally determine the thermal characteristic of the electric wire 3b before the characteristic estimation processing is completed, thereby to execute the overcurrent protection control in parallel during the characteristic estimation processing.

Therefore, when the characteristic estimation processing is started, first at S601, the overcurrent protection device 1 determines whether the execution of the present characteristic estimation processing is the first time. That is, at S601, the overcurrent protection device 1 determines whether the characteristic estimation processing has been executed before the execution of the present characteristic estimation processing.

When the execution of the present characteristic estimation processing is not the first time (that is, S601=NO), it means that the characteristic estimation processing has been executed before the execution of the present characteristic estimation processing. In other words, the overcurrent protection device 1 has estimated the thermal characteristic of the electric wire 3b in the past. Therefore, in this case, the overcurrent protection device 1 allows the processing to proceed to S602. At S602, the overcurrent protection device 1 sets a thermal characteristic estimated during the execution of the previous characteristic estimation processing as a provisional thermal characteristic.

On the other hand, if the execution of the present characteristic estimation processing is the first time (that is, S601=YES), a previous value of the thermal characteristic estimation does not exist. Specifically, for example, the shipping inspection of the vehicle corresponds to this case. Therefore, in this case, the overcurrent protection device 1 allows the processing to proceed to S603. At S603, the overcurrent protection device 1 sets a predetermined initial value as a provisional thermal characteristic. As this initial value, for example, a thermal characteristic corresponding to the one having the lowest heat resistance among the thermal characteristics stored in the data storage portion 16 can be used.

After the provisional thermal characteristic is set at S602 or S603, the overcurrent protection device 1 allows the processing to proceed to S604. At S604, the overcurrent protection device 1 acquires the ambient temperature Ta and the power supply voltage V. Next, at S605, the overcurrent protection device 1 starts energization of the load current.

When energization of the load current is started, the overcurrent protection device 1 detects the load current value at S606. The detected load current value is sequentially stored in the memory or the data storage portion 16 in the controller 10 while being associated with the elapsed time from the start of energization of the load current in order to obtain the load current curve.

Next, at S607, the overcurrent protection device 1 calculates an estimated temperature Te of the electric wire 3b based on the latest load current value detected at S606 and the provisional thermal characteristic set at S602 or S603. Subsequently, at S608, the overcurrent protection device 1 determines whether the estimated temperature Te calculated at S607 is not more than a predetermined threshold temperature Te_th. The calculation processing of the estimated temperature Te at S607 and the determination processing at S608 are similar to the conventional overcurrent protection control except that the thermal characteristic is a provisionally determined value.

When the estimated temperature Te exceeds the threshold temperature Te_th (that is, S608=NO), the overcurrent protection device 1 allows the processing to proceed to S609, and then ends the characteristic estimation processing. At S609, the overcurrent protection device 1 interrupts energization of the load current. That is, the controller 10 outputs the overcurrent protection signal.

When the estimated temperature Te is not more than the threshold temperature Te_th (that is, S608=YES), the overcurrent protection device 1 allows the processing to proceed to S610. At S610, the overcurrent protection device 1 determines whether the load current has become steady.

Specifically, at S610, the overcurrent protection device 1 determines whether a predetermined time has elapsed from a time when a change amount of the load current per unit time (for example, one second) becomes less than a predetermined value. The predetermined time is set to a sufficient time enough to estimate the type of the electric wire 3b by comparing the load current curve with the plurality of allowable current characteristics as shown in FIG. 5. For example, the predetermined time can be set to about 1 to 2 seconds.

When the load current is not steady (that is, S610=NO), the overcurrent protection device 1 returns the processing to S606. As a result, the load current value is detected and stored repeatedly until the load current becomes steady. On the other hand, when the load current has become steady (that is, S610=YES), the overcurrent protection device 1 executes the processing of S611 to S614 and then ends the characteristic estimation processing.

At S611, the overcurrent protection device 1 acquires the load current curve based on the load current value that is stored while being associated with the elapsed time from the start of energization of the load current. In the present embodiment, when the load current curve is acquired, the stored load current value is corrected to the maximum current value assumed from the power supply voltage V and the ambient temperature Ta acquired at S604. If necessary, a predetermined coefficient that takes the influence of variations in characteristics and aging into consideration can also be multiplied. At S612, the overcurrent protection device 1 reads the plurality of thermal characteristics from the data storage portion 16.

At S613, the overcurrent protection device 1 specifies the type of the electric wire 3b based on the acquired load current curve and the plurality of read thermal characteristics. At S614, the overcurrent protection device 1 estimates the thermal characteristic corresponding to the specified type as the thermal characteristic of the electric wire 3b and sets the thermal characteristic of the electric wire 3b as the thermal characteristic for overcurrent protection control. That is, the thermal characteristic for the overcurrent protection control is updated from the provisionally determined value.

As described above, in the configuration according to the present embodiment, the characteristic estimation portion 15 estimates the thermal characteristic of the electric wire 3b based on the load current detected by the current detector 12. In other words, by actually passing the load current in an on-vehicle state in which the overcurrent protection device 1 is electrically connected to the power supply 2 and the load circuit 3, the thermal characteristic of the electric wire 3b is automatically set by the characteristic estimation portion 15.

According to such a configuration, the overcurrent protection device 1 can perform an appropriate overcurrent protection operation autonomously by merely starting up as an in-vehicle state without setting the thermal characteristic in advance before mounted on the vehicle. Therefore, the overcurrent protection device 1 can be provided as a general-purpose overcurrent protection device adaptable to various load circuits 3.

(Modifications)

The present disclosure is not limited to the specific example described in the above-described embodiment. That is, it is possible to appropriately change the above-described embodiment. Representative modifications will be described below. In the following description of modifications, only parts different from the above-described embodiment will be described. In addition, in the above-described embodiment and the modifications, the same reference numerals are given to the same or equivalent parts. Therefore, in the description of the following modifications, regarding components having the same reference numerals as the components of the above-described embodiment, the description in the above-described embodiment can be appropriately cited unless there is a technical inconsistency or a specific additional explanation.

The present disclosure is not limited to the specific examples described in the above-described embodiment. For example, all or a part of the overcurrent protection device 1 may be configured as an in-vehicle microcomputer including a CPU, a ROM, a RAM, and a rewritable nonvolatile memory, for example. Alternatively, all or a part of the overcurrent protection device 1 may be configured as an application specific integrated circuit (ASIC) such as a gate array.

The voltage detector 13 can be omitted. In this case, the characteristic estimation portion 15 estimates the type, that is, the thermal characteristic of the electric wire 3b based on the temporal change of the load current detected by the current detector 12 and the ambient temperature Ta. Specifically, for example, the characteristic estimation portion 15 estimates the type, that is, the thermal characteristic of the electric wire 3b assuming that the power supply voltage is the worst condition (for example, about 1.2 times the nominal voltage of the power supply 2).

The temperature detector 14 may be provided outside the intelligent power device. Specifically, for example, the temperature detector 14 may be mounted on a board in the vehicle load control ECU at a position different from a position of the intelligent power device. Alternatively, the temperature detector 14 may be provided outside the vehicle load control ECU. That is, for example, outputs of an outside air temperature sensor and an intake air temperature sensor can be used as the output of the temperature detector 14.

The temperature detector 14 can be omitted. Specifically, for example, the characteristic estimation portion 15 estimates the type, that is, the thermal characteristic of the electric wire 3b assuming that the ambient temperature is the worst condition (for example, 100° C.).

In the above-described embodiment, after estimating the type of the electric wire 3b, the thermal characteristic of the electric wire 3b is estimated based on the estimation result. However, such expressions have been made in order to easily explain the content of the present disclosure. Accordingly, the present disclosure is not limited to such aspects.

That is, data (for example, AVS 0.3 sq) representing the type of the electric wire 3b is not essential. In other words, the estimation of the type of the electric wire 3b is not essential. In short, it is sufficient if the information related to the thermal characteristics of a plurality of electric wires 3b is stored in the data storage portion 16.

The information related to the thermal characteristics of the plurality of electric wires 3b stored in the data storage portion 16 is not limited to the thermal characteristic value. Specifically, for example, allowable current characteristics of a plurality of electric wires 3b can also be stored in the data storage portion 16. In other words, the data storage portion 16 can store information related to allowable current values and allowable flowing times of a plurality of types of electric wires 3b. In this case, the data storage portion 16 can store, for example, both the thermal characteristics and the allowable current characteristics of a plurality of types of electric wires 3b.

The controller 10 and the characteristic estimation portion 15 can be realized as control logic provided inside the intelligent power device.

The data storage portion 16 may be a database provided outside the vehicle load control ECU.

The constituent element(s) of the above-described embodiment is/are not necessarily essential unless it is specifically stated that the constituent element(s) is/are essential in the above-described embodiment, or unless the constituent element(s) is/are obviously essential in principle. In addition, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as essential or is obviously essential in view of the principle. Similarly, in the case where the shape, the direction, the positional relationship, and/or the like of the constituent element(s) is/are specified, the present disclosure is not necessarily limited to the shape, the direction, the positional relationship, and/or the like unless the shape, the direction, the positional relationship, and/or the like is/are indicated as essential or is/are obviously essential in principle.

The modifications are not limited to the above-described examples. A plurality of modifications may be combined with each other. Furthermore, all or a part of the above-described embodiment and all or a part of the modifications may be combined with each other.

What is claimed is:

1. An overcurrent protection device to be provided between a power supply and a load circuit that includes an electric load and an electric wire electrically connected with each other, comprising:
   a switching element switching flowing and interrupting of a load current that flows from the power supply to the electric load;
   a current detector detecting the load current;
   a characteristic estimation portion estimating a thermal characteristic of the electric wire based on the load current detected by the current detector;
   a controller outputting an overcurrent protection signal for interrupting the load current so as to protect the load circuit from an overcurrent to the switching element based on the thermal characteristic estimated by the characteristic estimation portion and the load current detected by the current detector; and
   a data storage portion storing information relating to thermal characteristics of a plurality of types of electric wires correspondingly to each type, wherein
   the characteristic estimation portion estimates a type of the electric wire based on a temporal change of the load current detected by the current detector, and estimates the thermal characteristic corresponding to the estimated type as the thermal characteristic of the electric wire.

2. The overcurrent protection device according to claim 1, further comprising
a temperature detector detecting an ambient temperature of the electric wire, wherein
the characteristic estimation portion estimates the type of the electric wire based on the temporal change of the load current detected by the current detector and the ambient temperature detected by the temperature detector.

3. The overcurrent protection device according to claim 1 further comprising
a voltage detector detecting a power supply voltage that is an output voltage of the power supply, wherein
the characteristic estimation portion estimates the type of the electric wire based on the temporal change of the load current detected by the current detector and the power supply voltage detected by the voltage detector.

4. The overcurrent protection device according to claim 1, wherein
the data storage portion stores the thermal characteristics of the plurality of types of electric wires.

5. The overcurrent protection device according to claim 1, wherein
the data storage portion stores information related to allowable current values and allowable flowing times of the plurality of types of electric wires.

6. The overcurrent protection device according to claim 1, wherein
the electric load is an in-vehicle load, and
the electric wire is a vehicle wire harness.

* * * * *